United States Patent [19]
Anderson

[11] 3,947,079
[45] Mar. 30, 1976

[54] TEMPERATURE COMPENSATED SPINDLE

[75] Inventor: Warren D. Anderson, Stamford, Conn.

[73] Assignee: FAG Bearings Corporation, Stamford, Conn.

[22] Filed: Nov. 11, 1974

[21] Appl. No.: 522,472

[52] U.S. Cl. .............. 308/228; 308/184 R; 308/194; 51/134.5 R; 57/134; 242/129.5
[51] Int. Cl.² ........................................ F16C 35/08
[58] Field of Search ......... 308/36, 58, 60, 149, 150, 308/151, 228, 156, 184 R, 184 A, 189 R, 189 A, 207 R; 51/134.5 R, 166.7; 242/129.5; 57/134, 135

[56] References Cited
UNITED STATES PATENTS

| | | | |
|---|---|---|---|
| 2,523,983 | 9/1950 | Arms | 308/184 R |
| 2,538,229 | 1/1951 | Boden | 308/184 R |

*Primary Examiner*—Robert R. Song
*Assistant Examiner*—Richard A. Bertsch
*Attorney, Agent, or Firm*—Buckles and Bramblett

[57] ABSTRACT

A precision machine tool spindle is mounted in a housing and machine frame by means which maintain the working end of the spindle in a fixed axial position while allowing the driven end to shift axially due to thermal expansion.

The foregoing abstract is not to be taken either as a complete exposition or as a limitation of the present invention. In order to understand the full nature and extent of the technical disclosure of this application, reference must be had to the following detailed description and the accompanying drawings as well as to the claims.

5 Claims, 2 Drawing Figures

VIEW A-A   SECT. B-B

TEMPERATURE COMPENSATED SPINDLE

BACKGROUND OF THE INVENTION

The invention is directed to a temperature compensating spindle mount for precision machine tools, and more particularly to means for maintaining the tool receiving end of a machine tool spindle in a predetermined fixed axial position regardless of variations in operating temperature.

The advent of numerically controlled machine tools, coupled with a general trend toward higher operating speeds and demand for increased precision in machining operations has created a need for spindles having increased rigidity, higher operating speeds, and greater thermal stability. That is to say, the axial movement of the tool must be held to a minimum as the spindle temperature rises from ambient room temperature to a higher steady state operating temperature.

Because of linear expansion of the spindle in the axial direction as it heats up, it is necessary to hold the working end fixed axially while making provision for expansionary movement at the driven end. Heretofore this has been accomplished by empolying a fixed bearing between the spindle and its housing at the work end and a floating bearing at the drive end. One of the drawbacks of this prior practice is that fixed bearings adequate to sustain the radial forces encountered at the working end of the spindle must be quite large in diameter and can therefore not be accommodated within a compact housing unless the engaging spindle diameter is substantially reduced. Reduction of spindle diameter reduces desired rigidity and introduces spindle flexing which is very detrimental to precision machining operations.

By the present invention I have devised a spindle mounting structure enabling the use of a large number of small diameter roller bearings to support the working end of a spindle, thus affording great rigidity and permitting a much larger spindle diameter to eliminate spindle flexing. At the opposite, or driven, end of the spindle I employ a preloaded duplex pair of larger diameter angular contact ball bearings as the fixed bearing support, the outer ball bearing races being fixedly mounted in an expansible spindle housing which is so designed and constructed as to expand linearly and simultaneously with axial expansion of the spindle as operating temperature increases.

Another problem encountered in the prior art has been the effect of linear (or axial) expansion of the concentric spindle housing with respect to the machine frame to which it must be mounted. If the spindle housing is solidly clamped to the machine frame at several points or throughout its entire length, as is customary in prior art structures, there is poor thermal stability because of binding as the housing, which is closer to the spindle, heats up more than the outside metal frame. Various solutions have been proposed for this problem, most involving the use of costly Invar (with nearly zero temperature coefficient of expansion) for construction of the spindle housing. By the present invention I have solved this aspect of the problem by means enabling the spindle housing to expand freely within the machine frame, thus allowing the use of less expensive base metals such as aluminum or brass for the spindle housing.

OBJECTS OF THE INVENTION

A primary object of the invention is to provide an improved spindle mounting for machine tools wherein the tool receiving end of the spindle is maintained in a predetermined axial position regardless of thermal expansion or contraction of the spindle and other parts due to variations in operating temperature.

Another object of the invention is to achieve the above object in a structure having maximum radial rigidity and minimum spindle flexing.

A further object of the invention is to achieve the above objects in an economical structure not requiring costly or exotic materials.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

DETAILED DESCRIPTION

Figure 1:
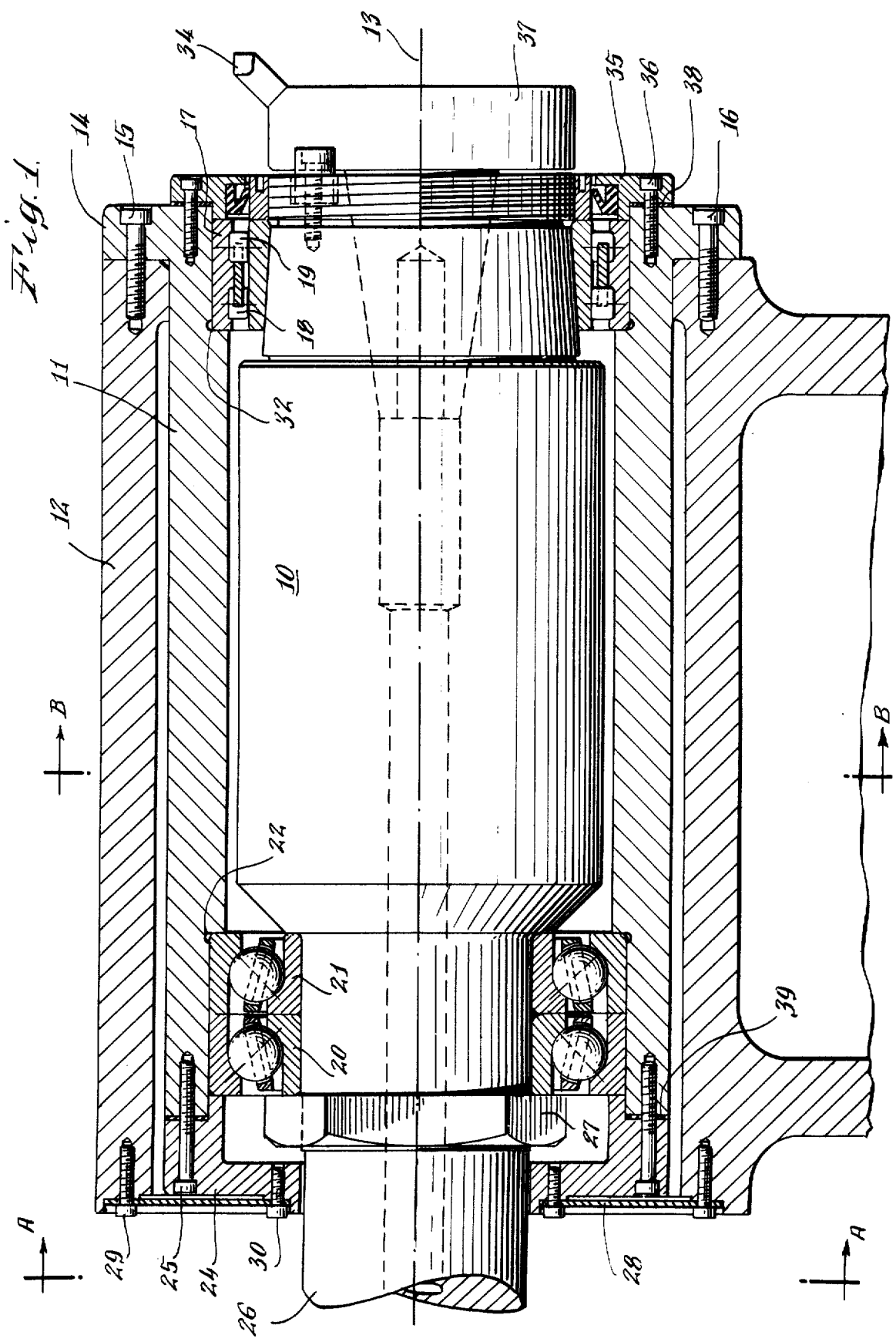
FIG. 1 is a vertical side elevation view, mostly in cross-section, showing the construction according to a preferred embodiment of the invention.
Figure 2:
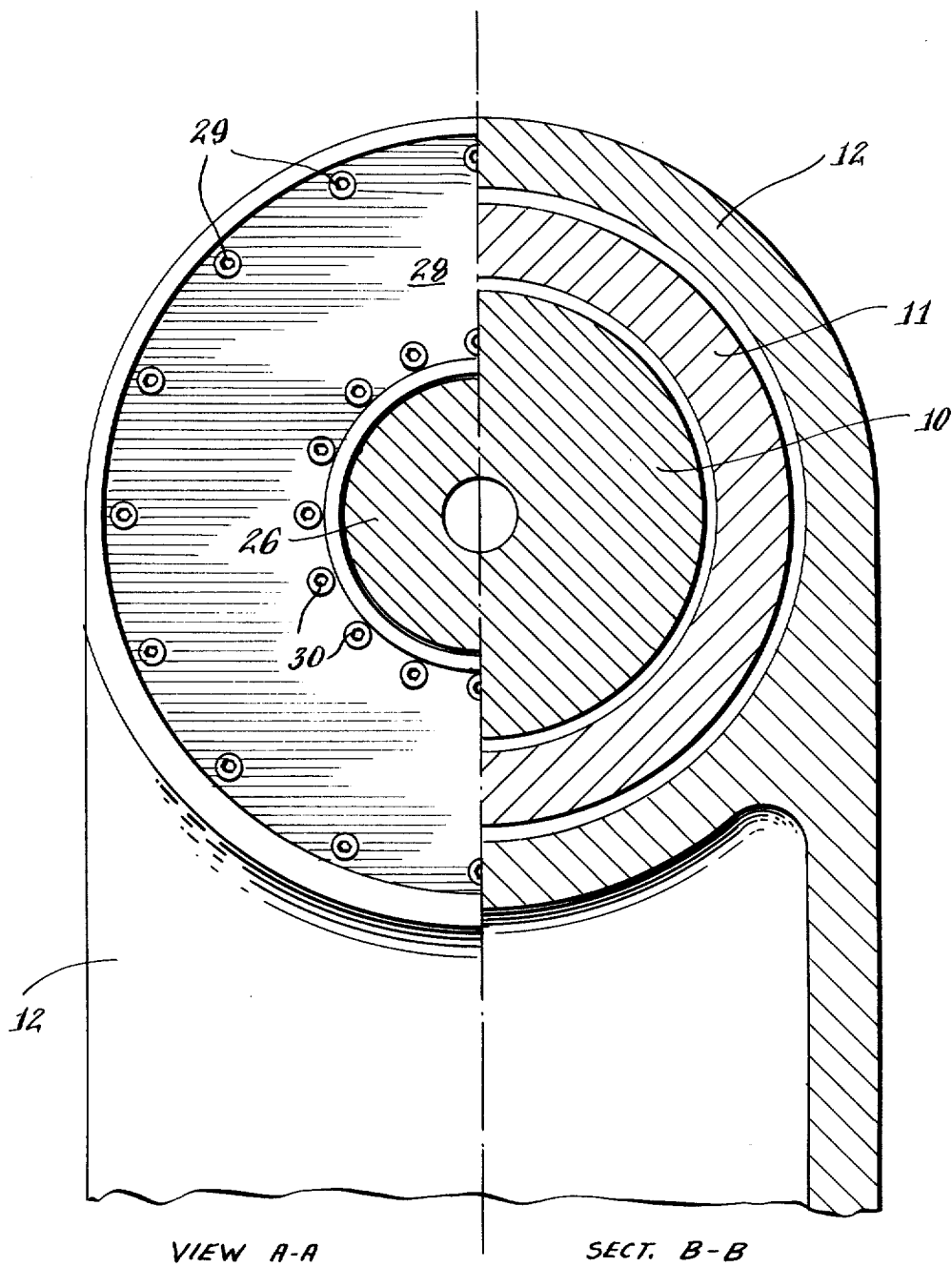
FIG. 2 is a combined end view and radial cross-section, the left half being an end view as taken along the line A—A of FIG. 1 and the right half thereof being in section along the line B—B of FIG. 1.

Referring now in greater detail to FIG. 1 of the drawings, the structure of a preferred embodiment comprises a spindle shaft 10 rotatably mounted within a cylindrical spindle housing 11, for rotation about a horizontal axis 13. Spindle housing 11 is rigidly mounted to the machine frame 12 by a radial flange 14 at the forward or working end of the spindle (shown to the right in FIG. 1). The flange 14 of spindle housing 11 is secured to the annular front edge of machine frame 12 by a plurality of annularly spaced machine screws such as 15 and 16. The plane of the junction between machine frame 12 and flange 14 of the spindle housing constitutes a fixed reference surface at the spindle working end. The spindle 10 is rotatably supported at the working end by a double-row cylindrical bearing comprised of a large number of small diameter rollers such as 18 and 19 in FIG. 1. This bearing construction is very rigid, accommodating a maximum of radial thrust, while at the same time permitting a larger spindle diameter for greater rigidity against spindle shaft flexing.

The opposite or driven end of the spindle 10 (shown to the left in FIG. 1) is rotatably supported by a pair of preloaded angular contact bearings 20–21, the outer races of which are fixedly mounted in the rear end of the spindle housing 11. The angular contact ball bearings 20–21 have their outer races clamped against annular shoulder 22 on the inner surface of spindle housing 11 by means of annular clamping ring 24 which is secured to the left end of spindle housing 11 by a plurality of machine screws 25. The inner races of ball bearings 20–21 are secured to a reduced diameter portion 26 of spindle shaft 10 by a clamping ring 27. Axial contact bearings 20–21 constitute a fixed (axial locating) bearing to prevent any relative motion axially between spindle shaft 10 and spindle housing 11.

An annular elastic metallic diaphragm 28 at the left end of FIG. 1 has its outer periphery secured to the machine frame 12 by a plurality of annularly spaced machine screws 29, while the inner rim of diaphram 28 is secured to annular mounting ring 24 by annularly spaced screws 30. By this means spindle 10 and spindle housing 11 are floatingly supported within the machine frame 12 whereby both the spindle and its surrounding housing are free to expand to the left (as viewed in FIG. 1) as these parts heat up during operation. Such expansion is entirely within the machine frame and always to the left (as viewed in FIG. 1) of the front end reference plane formed by the junction between flange 14 of spindle housing 11 and the forward annular edge of machine frame 12. Thus the axial position of cutting tool 34 remains unchanged by spindle expansion and/or contraction.

The floating roller bearing 17 which rotatably supports the working end of the spindle 10 is seated securely against a forward annular shoulder 32 formed on the inner circumference of spindle housing 11 and is held thereagainst by a front end annular clamping ring 35 which is secured to the front end planar surface of housing flange 14 by a plurality of annularly spaced machine screws 36. The cutting tool 34 is secured to the spindle 10 by a conventional tool holder 37, as is well known in the art, and gaskets 38 and 39 are provided at the working and driven ends respectively of the spindle housing to maintain integrity of the bearing lubrication system.

In operation, any axial thermal expansion which may occur between the plane of the cutting tool 34 and the reference plane of the housing flange 14 may be accommodated by right-to-left movement (as viewed in FIG. 1) of the inner race of floating bearing 17, thus leaving the tool 34 in its preselected cutting position. As the spindle 10 and its surrounding housing 11 both heat up during operation further axial expansion shifts the vertical plane between fixed bearings 20–21 to the left against the flexing of the end support diaphram 28, thus enabling the plane of the cutting tool 34 to remain fixed axially, while the spindle and its housing expand linearly within the machine frame 12. As the spindle itself normally operates at a higher temperature than the surrounding spindle housing, the housing 11 is preferably formed of a material having a higher coefficient of expansion than the spindle 10. In the construction illustrated by the drawings I have found that the use of aluminum (which has a coefficient of expansion of $13 \times 10^{-6}$/Deg. F.) for the spindle housing 11, and heat treated steel (having a coefficient of expansion of $6.5 \times 10^{-6}$/Deg. F.) for the spindle 10 provide substantially 100 percent temperature compensation throughout the entire range of operating temperatures encountered in a modern high speed numerically controlled machine tool. In other embodiments designed to operate over somewhat different temperature ranges, brass having a temperature coefficient of expansion of $10.0 \times 10^{-6}$/Deg. F. may be employed for the spindle housing 11. Both of these materials are far less expensive than the exotic alloys, such as Invar, which have heretofore been proposed because of their nearly zero temperature coefficients of expansion.

It will be understood by those skilled in the art that the fixed (axial locating) bearing may take the form of a double row tapered roller bearing instead of the preloaded pair of ball bearings 20–21 illustrated in the drawing of the preferred embodiment, or it may be a pair of ball thrust bearings. Similarly the floating bearing which rotatably supports the spindle at the working end may either be a cylindrical roller bearing or a ball bearing mounted with a sliding fit of the outer ring in the housing, all without departing from the scope of the invention.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. A rotatable spindle support for a machine tool comprising in combination a rigid machine frame, a cylindrical housing enclosing the spindle and securely mounted to said frame at the working end of the spindle, a floating bearing mounted in said housing and radially supporting the spindle at its working end, said floating bearing comprising a large number of small diameter roller bearings supporting a large diameter portion of the spindle working end, a fixed bearing mounted in said housing at the opposite end thereof comprising a preloaded duplex pair of angular contact ball bearings supporting a smaller diameter portion of the spindle shaft at its driven end, and axially flexible mounting means securing said housing to said frame at the driven end of the spindle, whereby the spindle and said housing are free to expand axially at the driven end while remaining axially fixed at the working end.

2. A rotatable spindle support for a machine tool comprising in combination a rigid machine frame, a cylindrical housing enclosing the spindle and securely mounted to said frame at the working end of the spindle, a floating bearing mounted in said housing and radially supporting the spindle at its working end, a fixed bearing mounted in said housing at the opposite end thereof and supporting the spindle at its driven end, and axially flexible mounting means securing said housing to said frame at the driven end of the spindle, whereby the spindle and said housing are free to expand axially at the driven end while remaining axially fixed at the working end.

3. The combination of claim 2 wherein said spindle housing is constructed of a material having a thermal coefficient of expansion greater than that of the spindle material.

4. The combination of claim 2 wherein said axially flexible mounting securing said housing to said frame at the driven end of said spindle comprises an elastic metallic diaphragm.

5. The structure of claim 2 wherein said cylindrical spindle housing is formed of aluminum and the spindle is formed of steel.

\* \* \* \* \*